(12) United States Patent
Koguchi et al.

(10) Patent No.: US 12,450,784 B2
(45) Date of Patent: Oct. 21, 2025

(54) PERIPHERAL VIDEO GENERATION DEVICE, PERIPHERAL VIDEO GENERATION METHOD, AND STORAGE MEDIUM STORING PROGRAM

(71) Applicant: DENSO CORPORATION, Kariya (JP)

(72) Inventors: Takahiro Koguchi, Kariya (JP); Yousuke Hattori, Kariya (JP); Yusuke Sekikawa, Tokyo (JP)

(73) Assignee: DENSO CORPORATION, Kariya (JP)

( * ) Notice: Subject to any disclaimer, the term of this patent is extended or adjusted under 35 U.S.C. 154(b) by 326 days.

(21) Appl. No.: 17/650,201

(22) Filed: Feb. 7, 2022

(65) Prior Publication Data

US 2022/0156985 A1 May 19, 2022

Related U.S. Application Data

(63) Continuation of application No. PCT/JP2020/028542, filed on Jul. 22, 2020.

(30) Foreign Application Priority Data

Aug. 9, 2019 (JP) .................................. 2019-147985

(51) Int. Cl.
*G06T 11/00* (2006.01)
*G06T 7/50* (2017.01)

(52) U.S. Cl.
CPC ............... *G06T 11/00* (2013.01); *G06T 7/50* (2017.01); *G06T 2207/10016* (2013.01); *G06T 2207/10028* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2010/0045448 A1* | 2/2010 | Kakinami | G06V 20/586 382/154 |
| 2011/0285848 A1 | 11/2011 | Han et al. | |
| 2018/0178840 A1* | 6/2018 | Li | B60W 30/0956 |

(Continued)

FOREIGN PATENT DOCUMENTS

| | | |
|---|---|---|
| JP | 2001-34898 A | 2/2001 |
| JP | 2010-72836 A | 4/2010 |
| JP | 2018-142297 A | 9/2018 |

*Primary Examiner* — Kyle Zhai
(74) *Attorney, Agent, or Firm* — Maschoff Brennan

(57) ABSTRACT

A peripheral video generation device includes: a video input unit that inputs peripheral video data captured by a plurality of cameras; a video composition unit that composites the peripheral video data to generate a composite video as viewed from a predetermined viewpoint; a three-dimensional shape estimation unit that estimates a three-dimensional shape of a peripheral object based on the peripheral video data; a shielded area estimation unit that uses an estimation result of the three-dimensional shape to estimate a shielded area not visible from the predetermined viewpoint in the composite video; an inference unit that infers a video of the shielded area using deep learning; and a video superimposition unit that superimposes the video inferred by the inference unit on the shielded area in the composite video.

5 Claims, 6 Drawing Sheets

(56) References Cited

U.S. PATENT DOCUMENTS

| | | |
|---|---|---|
| 2018/0218227 A1 | 8/2018 | Takaki et al. |
| 2018/0247540 A1 | 8/2018 | Hagawa et al. |
| 2020/0026278 A1* | 1/2020 | Khanna .................. G06N 3/045 |
| 2020/0086791 A1* | 3/2020 | Hardy .................... G06T 3/4038 |

* cited by examiner

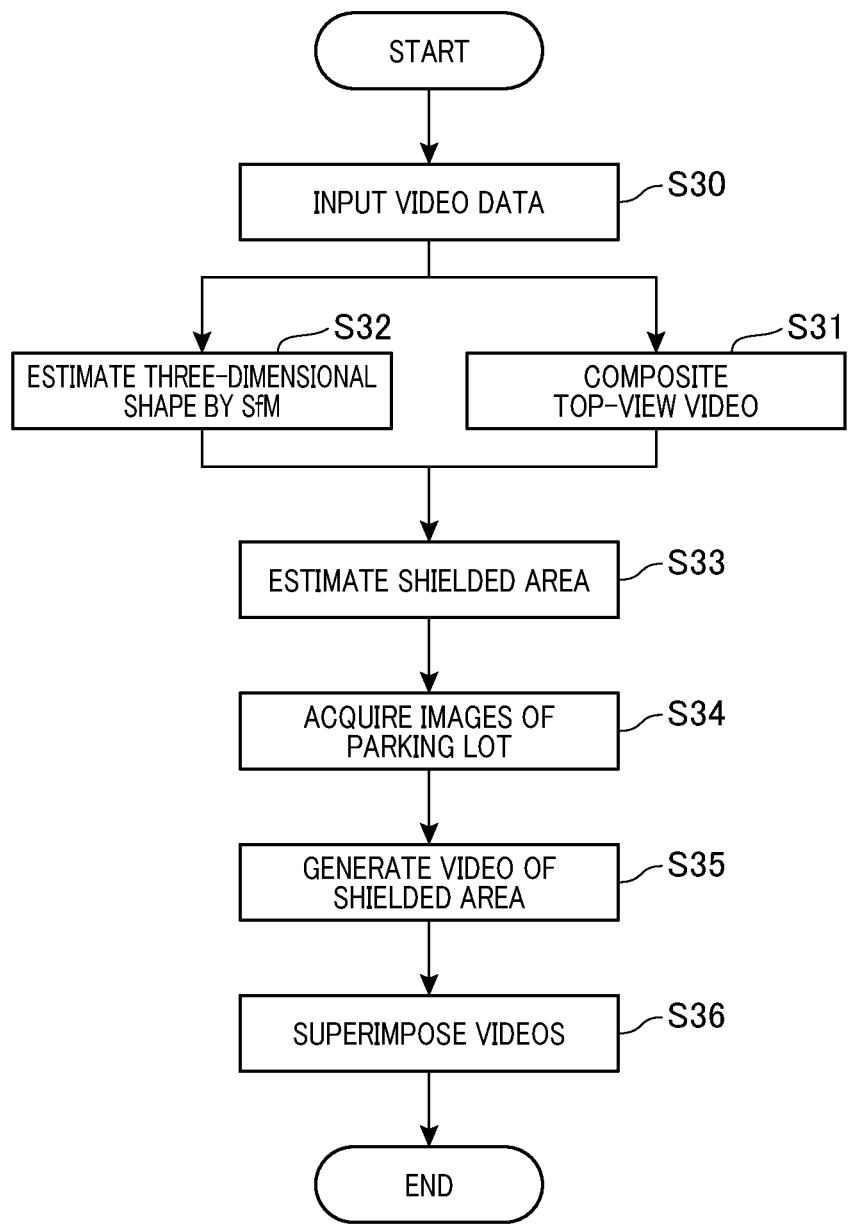

PERIPHERAL VIDEO GENERATION DEVICE, PERIPHERAL VIDEO GENERATION METHOD, AND STORAGE MEDIUM STORING PROGRAM

CROSS-REFERENCE TO RELATED APPLICATION

The present application is a continuation application of International Application No. PCT/JP2020/028542, filed on Jul. 22, 2020, which claims priority to Japanese Patent Application No. 2019-147985, filed on Aug. 9, 2019. The contents of these applications are incorporated herein by reference in their entirety.

BACKGROUND

1. Technical Field

The present disclosure relates to a peripheral video generation device.

2. Related Art

There have been conventionally known devices that provide a video captured by a camera mounted in a vehicle to a driver to allow him/her to recognize the conditions around the periphery of the vehicle.

SUMMARY

The present disclosure provides a peripheral video generation device. As an aspect of the present disclosure, a peripheral video generation device includes a video input unit, a video composition unit, a three-dimensional shape estimation unit, an inference unit, and a video superimposition unit. The video input unit inputs peripheral video data captured by a plurality of cameras. The video composition unit composites the peripheral video data to generate a composite video as viewed from a predetermined viewpoint. The three-dimensional shape estimation unit estimates a three-dimensional shape of a peripheral object based on the peripheral video data; a shielded area estimation unit that uses an estimation result of the three-dimensional shape to estimate a shielded area not visible from the predetermined viewpoint in the composite video. The inference unit infers a video of the shielded area using deep learning. The video superimposition unit superimposes the video inferred by the inference unit on the shielded area in the composite video.

BRIEF DESCRIPTION OF THE DRAWINGS

In the accompanying drawings:

FIG. 7 is a diagram illustrating operations of the peripheral video generation device in the third embodiment.

DETAILED DESCRIPTION OF THE PREFERRED EMBODIMENTS

Figure 1:
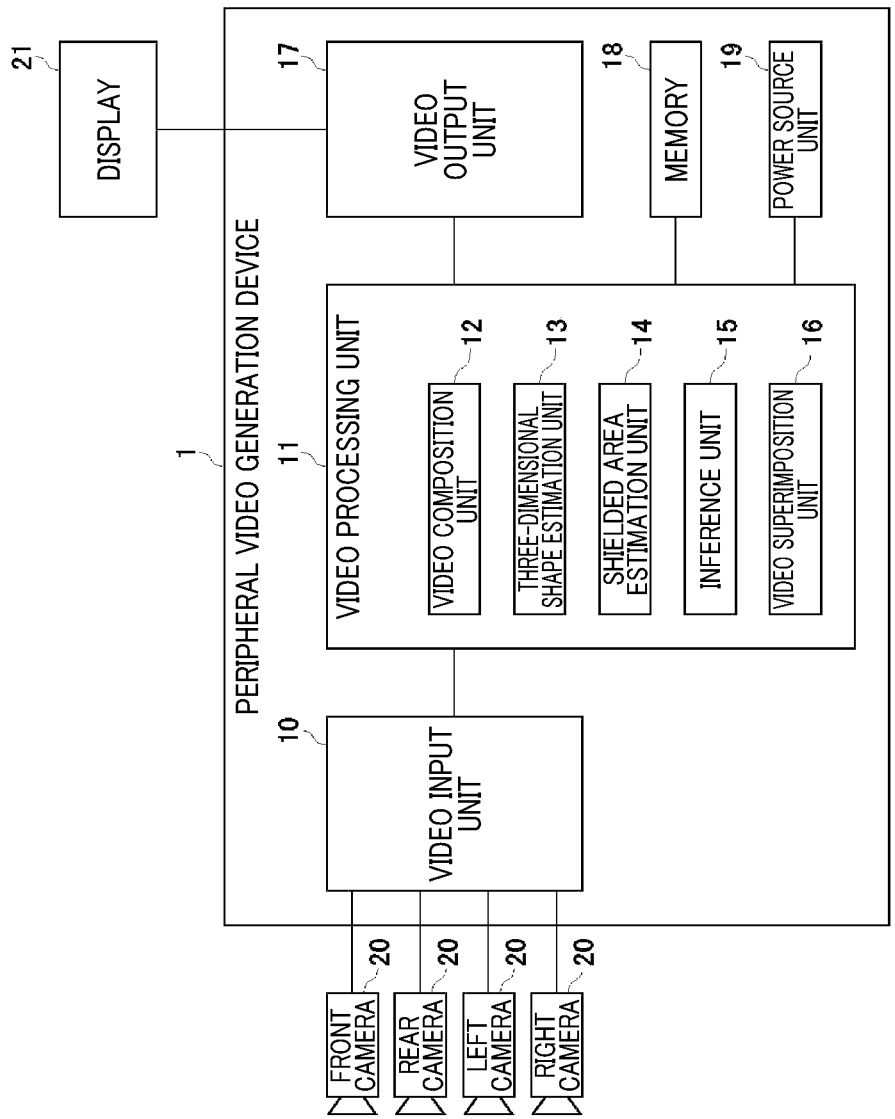
FIG. 1 is a diagram illustrating a configuration of a peripheral video generation device in a first embodiment.

For example, JP 2012-514558 A (hereinafter, referred to as "PTL 1") discloses an invention of a peripheral video generation device that corrects videos captured by cameras installed at the front, rear, left, and right parts of a vehicle into a top-view form and provides the top-view video to the driver.

If an attempt is made to composite several meters or more of areas in top-view video as described above, an area shielded by an object existing around the periphery of the vehicle looks distorted so that it is harder to intuitively grasp the conditions in the shielded area from the video with increasing proximity to the ends of the screen.

In view of the above-described circumferences, an object of the present disclosure is to provide a peripheral video generation device that is capable of generating a peripheral video that appears more natural regardless of the presence or absence of an object.

In order to solve the foregoing issue, the present disclosure adopts technical units described below. The parenthesized reference signs described in the claims show, by way of example, correspondences with specific units described later in relation to an embodiment as a mode of the present disclosure, and are not intended to limit the technical scope of the present disclosure.

A peripheral video generation device according to the present disclosure includes: a video input unit that inputs peripheral video data captured by a plurality of cameras; a video composition unit that composites the peripheral video data to generate a composite video as viewed from a predetermined viewpoint; a three-dimensional shape estimation unit that estimates a three-dimensional shape of a peripheral object based on the peripheral video data; a shielded area estimation unit that uses an estimation result of the three-dimensional shape to estimate a shielded area not visible from the predetermined viewpoint in the composite video; an inference unit that infers a video of the shielded area using deep learning; and a video superimposition unit that superimposes the video inferred by the inference unit on the shielded area in the composite video. The three-dimensional shape estimation unit may estimate the three-dimensional shape based on detection data detected by a ranging sensor.

According to the present disclosure, it is possible to display even a video of an area shielded by a peripheral object, without producing an unnatural appearance.

Hereinafter, peripheral video generation devices in embodiments of the present disclosure will be described with reference to the drawings. The peripheral video generation devices in the embodiments described below are each mounted in a vehicle and used to generate and display a top-view video of the periphery of the vehicle. The embodiments will be described with reference to a scene in which a peripheral video is generated in a parking lot as an example. However, the use applications of the peripheral video generation devices in the present disclosure are not limited to vehicles but may be others.

First Embodiment

FIG. 1 is a diagram illustrating a configuration of a peripheral video generation device 1 in a first embodiment.

The peripheral video generation device 1 is connected to four cameras 20 and a display 21 mounted in a vehicle. The four cameras 20 are cameras 20 that capture respective videos of the front, rear, left, and right sides of the vehicle. The display 21 may also function as display 21 of a navigation device, and displays the videos captured by the cameras 20.

The peripheral video generation device 1 includes: a video input unit 10 that inputs peripheral video data captured by the four cameras 20; a video processing unit 11 that processes the peripheral video data input into the video input unit 10 to generate a top-view video; a video output unit 17 that outputs the top-view video; a memory 18; and a power source unit 19. The video output unit 17 transmits the video data to the display 21.

The video processing unit 11 includes: a video composition unit 12 that composites the peripheral video data to generate the top-view video as viewed from above the vehicle; a three-dimensional shape estimation unit 13 that estimates the three-dimensional shape of a peripheral object based on the peripheral video data; a shielded area estimation unit 14 that uses an estimation result of the three-dimensional shape to estimate a shielded area not visible from the predetermined viewpoint in the composite video; an inference unit 15 that infers a video of the shielded area using deep learning; and a video superimposition unit 16 that superimposes the video inferred by the inference unit 15 on the shielded area in the composite video.

The video composition unit 12 composites the video data input from the four cameras 20 into the video input unit 10 to generate the top-view video. An officially known technique as described in PTL 1, for example, may be used for the video composition unit 12.

The three-dimensional shape estimation unit 13 uses a Structure from Motion (SfM) technique on the video data input from the cameras 20 into the video input unit 10 to estimate the three-dimensional shape of an object seen in the video. The SfM technique is described, for example, by Kazuo Oda, in "Commentary on Structure from Motion (SfM), First Discussion: Overview of SfM and Bundle Adjustment", Photogrammetry and Remote Sensing, Vol. 55, No. 3. The three-dimensional shape estimation unit 13 superimposes the results of estimation based on the video data from the cameras 20 to estimate the three-dimensional shape of an object existing around the periphery of the vehicle.

The shielded area estimation unit 14 uses information on the estimated three-dimensional shape of the object to estimate a shielded area that is shielded and made invisible by the object in the top-view video, and masks the shielded area.

The inference unit 15 infers a video of the shielded area using a generator created by deep learning. In the present embodiment, a generative adversarial network (GAN) is used for deep learning.

Figure 2:
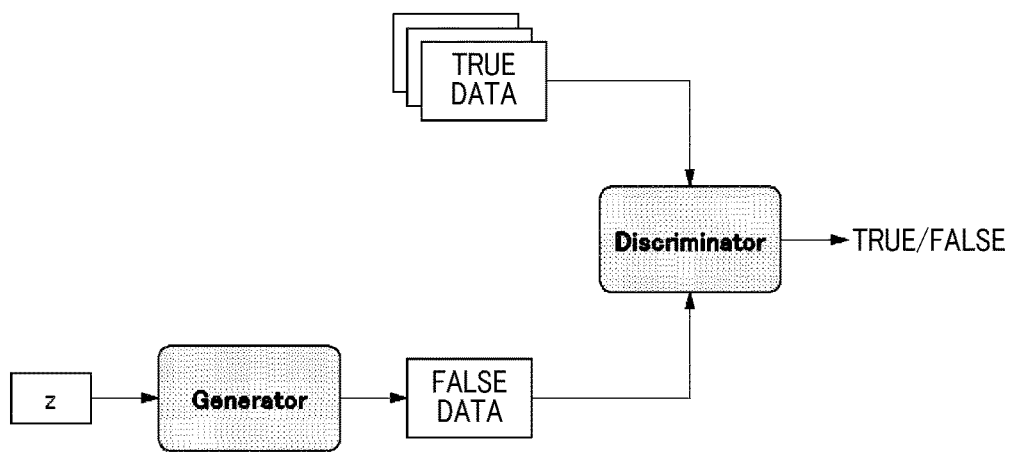
FIG. 2 is a diagram illustrating a configuration of a generative adversarial network (GAN)

FIG. 2 is a diagram describing a GAN. The GAN includes a generator (hereinafter, also called "G") and a discriminator (hereinafter, also called "D"). The generator G is a neural network model that generates an image intended to fool the discriminator D. The discriminator D is a neural network model that discriminates between the image (false data) generated by the generator G and a correct image (true data). In the GAN, the generator G and the discriminator D are alternately subjected to learning. First, the learning of the generator G will be described. A Vector Z is sampled and supplied to the generator G to output an image (false data). The image is supplied to the discriminator D to determine whether the image is true or false. The generator G is subjected to learning with updating of the parameters of the generator G such that the discriminator D discriminates the image as true. This allows the generator G to generate an image for fooling the discriminator D.

Then, the parameters of the generator G are fixed and the discriminator D is subjected to learning. The parameters of the discriminator D are updated such that there is a large difference in output between when the discriminator D is supplied training data (true data) and when the discriminator D is supplied an image generated by the generator G (false data). This allows the discriminator D to discriminate the image generated by the generator G (false data).

Alternately repeating the learning of the generator G and the learning of the discriminator D allows the generator G to generate an image close to a true one.

The inference unit 15 has a generator created in advance by the GAN. The generator learning by the GAN may be performed using a video of a real parking lot, or may be performed by creating a CG image of a parking lot and using auto-labelling training data on a shielded area in the CG image. According to the method by which to generate a CG image of a parking lot, it is easy to prepare a large volume of training data.

Assuming that the shielded area masked by the shielded area estimation unit 14 is a missing area in a fill-in-the-blank problem, the inference unit 15 infers a video of the shielded area with the use of the generator.

The video superimposition unit 16 superimposes the video of the shielded area inferred by the inference unit 15 on the top-view video. The video superimposition unit 16 superimposes the video of the shielded area inferred by the inference unit 15 in a display mode different from that of the top-view video so that it can be seen that the shielded area is an invisible area. The different display mode is, for example, to display the inferred video in a translucent color.

As above, the configuration of the peripheral video generation device 1 in the present embodiment has been described. An example of hardware of the peripheral video generation device 1 described above is an ECU that includes a CPU, a RAM, a ROM, a hard disk, a communication interface, and the like. Programs having modules for performing the above-described functions are stored in the RAM or the ROM, and the CPU executes the programs to implement the peripheral video generation device 1 described above. These programs are included in the scope of the present disclosure. Similarly, the other embodiments described below can be implemented by programs.

Figure 3:
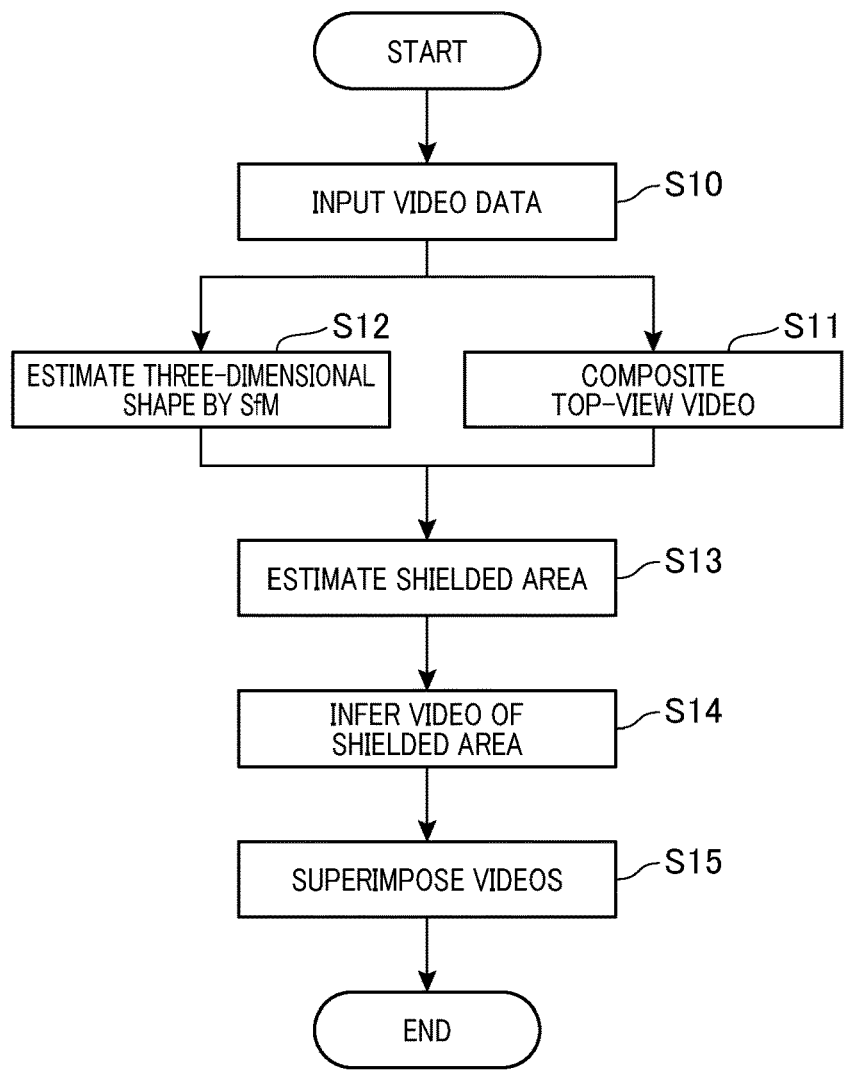
FIG. 3 is a diagram illustrating operations of the peripheral video generation device in the first embodiment.

FIG. 3 is a diagram illustrating operations of the peripheral video generation device 1 in the first embodiment. When video data is input from the four cameras 20 (S10), the peripheral video generation device 1 composites the video data from the four cameras 20 to generate a top-view video (S11). In parallel with this, the peripheral video generation device 1 uses the SfM technique on the video data to estimate the three-dimensional shape of an object seen in the video (S12).

The peripheral video generation device 1 then uses the information on the three-dimensional shape of the object to estimate an invisible shielded area in the top-view video (S13). Subsequently, the peripheral video generation device 1 infers video of the shielded area using the GAN (S14), and superimposes the inferred video on the top-view video (S15).

As above, the configuration and operations of the peripheral video generation device 1 in the first embodiment have been described.

The peripheral video generation device 1 in the first embodiment can infer the video of the area shielded and made invisible by an object, and superimposes the inferred video on the top-view video, thereby displaying the top-view video that appears more natural, that is, the top-view video without producing an unnatural appearance. In addition, superimposing the inferred video in a display mode different from that of the top-view video allows the driver to recognize the shielded area as an actually invisible area. This avoids the risk of the driver performing driving operations in the belief that the inferred video is real. Furthermore, this also has the effect of inviting the driver's attention to the shielded area from which humans or motorcycles may emerge.

In the present embodiment, by way of example, the GAN is used as a means for inferring the video of the shielded area. Alternatively, the video may be inferred by means other than the GAN. For example, the video of the shielded area may be inferred using a variational auto-encoder (VAE) or autoregressive model.

A preferable scene in which the peripheral video generation device 1 in the present embodiment is applied is an automated valet parking system will be described. Since the driver will not drive the vehicle in this scene, the inferred video of a shielded area can be superimposed without a problem. Thus, a passenger of the vehicle may see a video that appears less unnatural.

Second Embodiment

Figure 4:
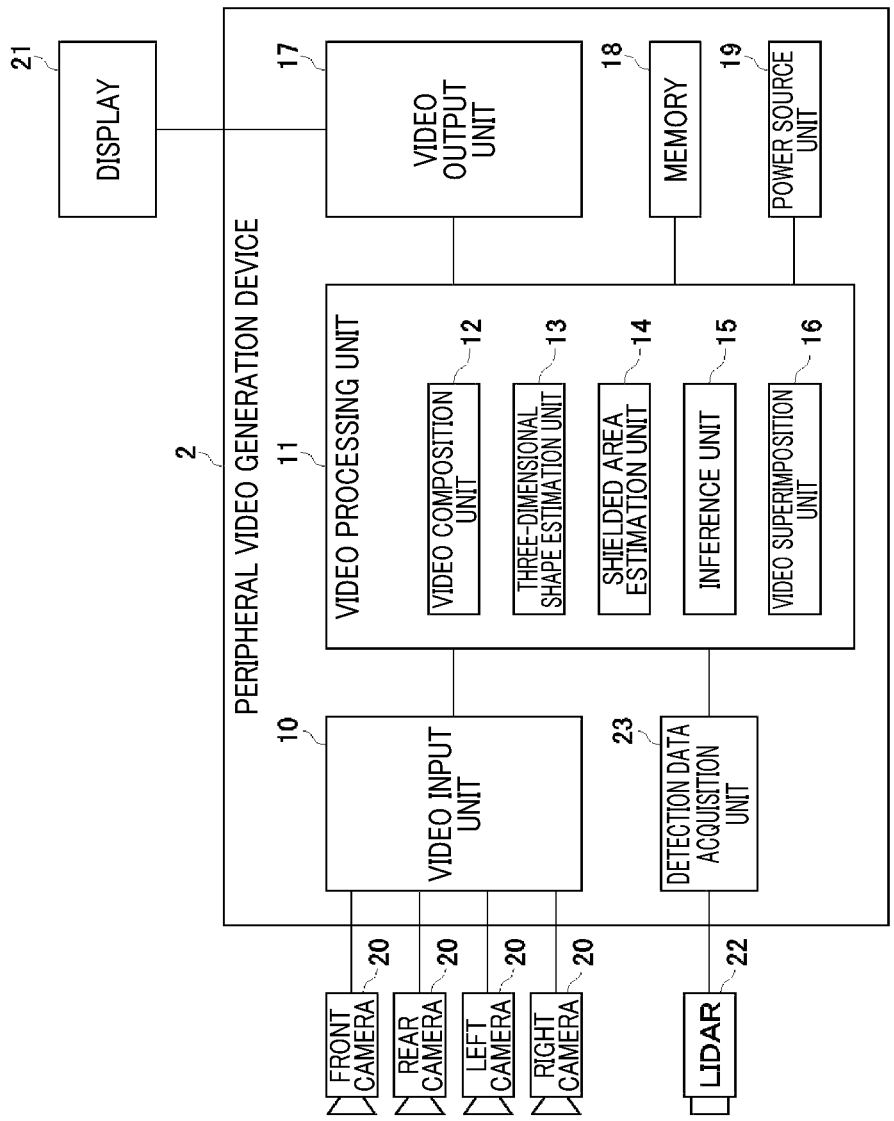
FIG. 4 is a diagram illustrating a configuration of a peripheral video generation device in a second embodiment.

FIG. 4 is a diagram illustrating a configuration of a peripheral video generation device 2 in a second embodiment. The peripheral video generation device 2 in the second embodiment includes a detection data acquisition unit 23 that acquires detection data from a LIDAR 22, in addition to the components of the first embodiment described above. In the second embodiment, the three-dimensional shape estimation unit 13 uses the detection data acquired from the LIDAR 22 to estimate the three-dimensional shape of an object existing in the periphery of the vehicle.

Figure 5:
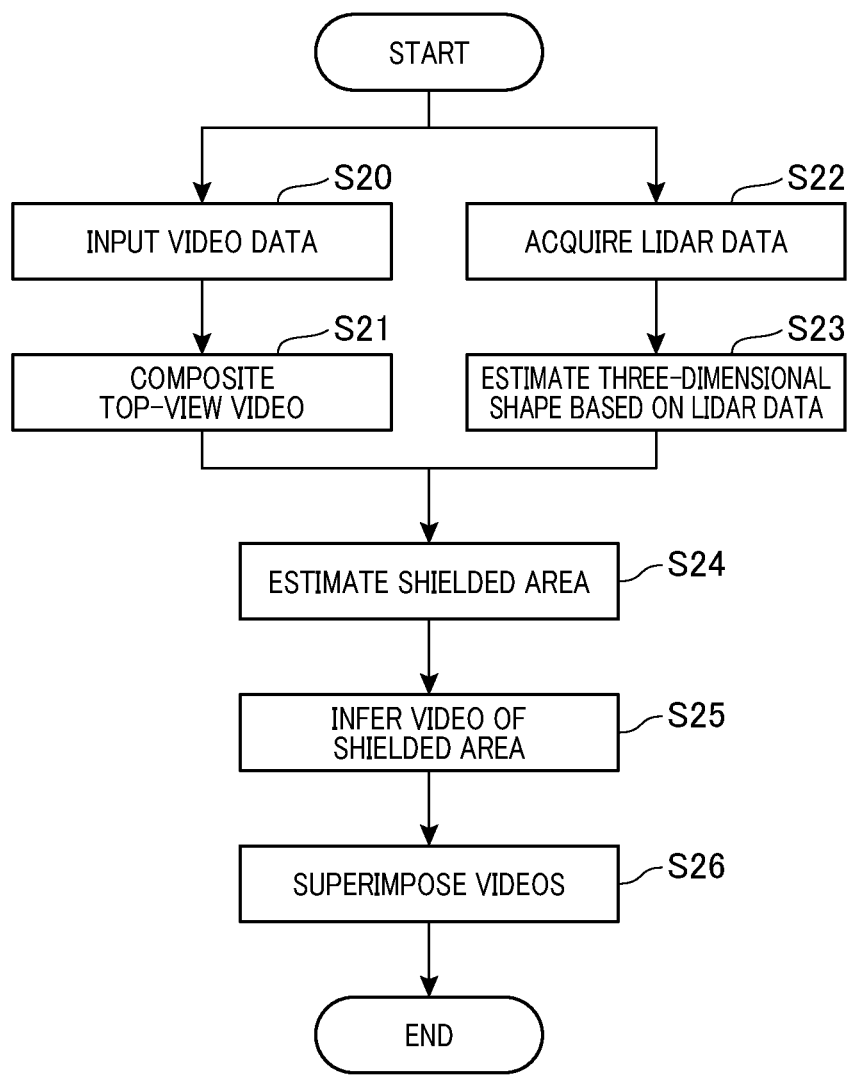
FIG. 5 is a diagram illustrating operations of the peripheral video generation device in the second embodiment.

FIG. 5 is a diagram illustrating operations of the peripheral video generation device 2 in the second embodiment.

When the video data is input from the four cameras 20 (S20), the peripheral video generation device 2 composites the video data from the four cameras 20 to generate a top-view video (S21). In parallel with this, the peripheral video generation device 2 acquires data from the LIDAR 22 (S22), and estimates the three-dimensional shape of an object existing in the periphery of the vehicle based on the acquired data (S23).

The peripheral video generation device 2 then uses the information on the three-dimensional shape of the object to estimate an invisible shielded area in the top-view video (S24). Subsequently, the peripheral video generation device 2 infers a video of the shielded area using the GAN (S25), and superimposes the inferred video on the top-view video (S26).

As above, the configuration and operations of the peripheral video generation device 2 in the second embodiment have been described. As in the first embodiment, the peripheral video generation device 2 in the second embodiment can display a top-view video that appears more natural. In addition, in the second embodiment, it is possible to estimate the three-dimensional shape of an object with accuracy using the data acquired from the LIDAR 22.

In the present embodiment, the data from the LIDAR 22 is used to estimate the three-dimensional shape of an object as an example. Alternatively, a ranging sensor other than the LIDAR 22 may be used, for example, such as a radar, an ultrasonic sonar, or a millimeter wave radar.

Third Embodiment

Figure 6:
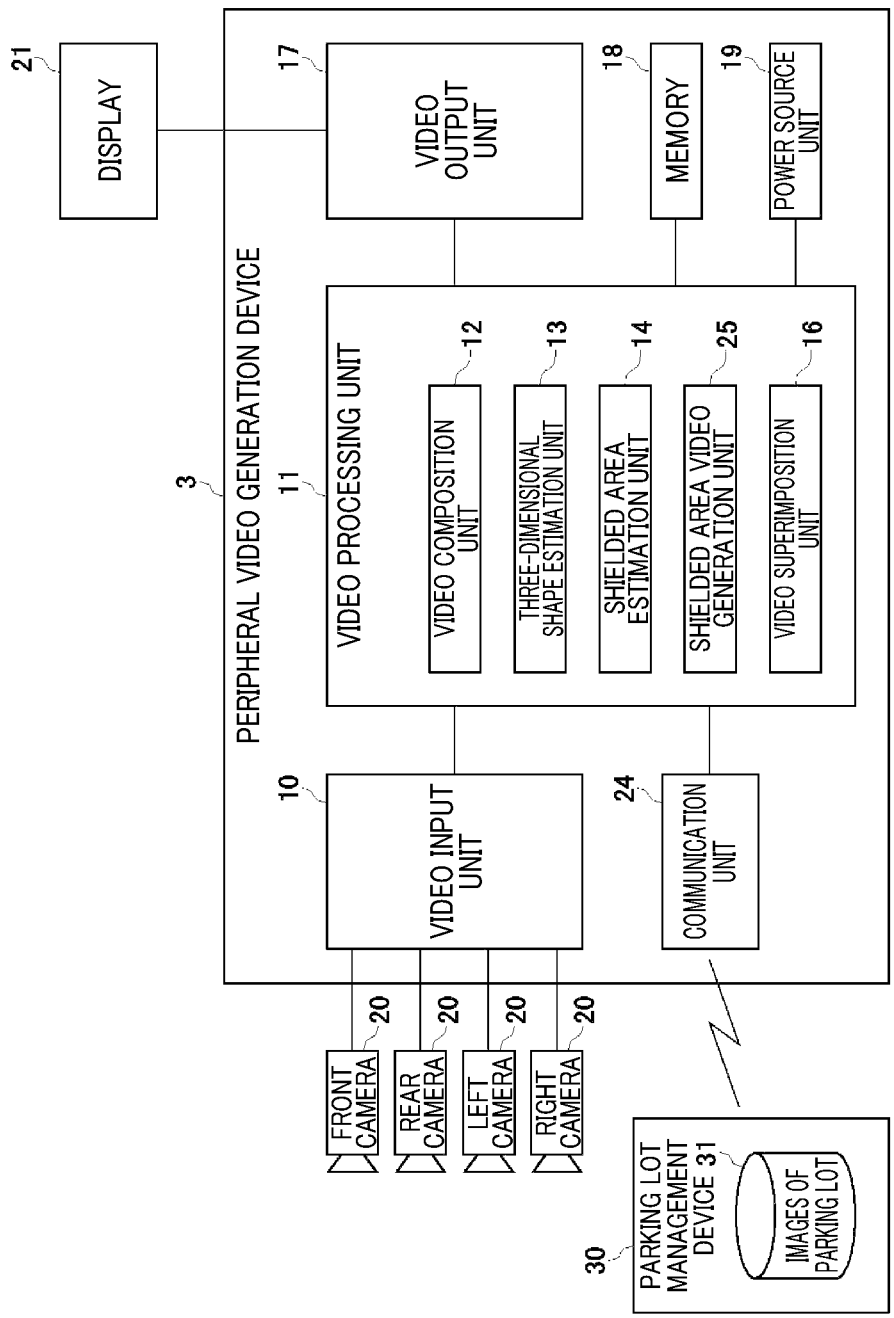
FIG. 6 is a diagram illustrating a configuration of a peripheral video generation device in a third embodiment.

FIG. 6 is a diagram illustrating a configuration of a peripheral video generation device 3 in a third embodiment. The peripheral video generation device 3 in the third embodiment is different from the other embodiments, in that a video of a shielded area is not estimated using deep learning but is generated using images of an environment in which the vehicle is placed.

The peripheral video generation device 3 in the third embodiment has a communication unit 24 to communicate with a parking lot management device 30 that manages a parking lot. The parking lot management device 30 includes a storage unit that stores images of the parking lot managed. The parking lot management device 30 transmits the images to the peripheral video generation device 3 in response to being requested to transmit images of the parking lot by the peripheral video generation device 3 mounted in the vehicle.

A video processing unit 11 of the peripheral video generation device 3 in the third embodiment includes a shielded area video generation unit 25, instead of the inference unit 15 included in the peripheral video generation device 1 in the first embodiment. The shielded area video generation unit 25 processes the images of the parking lot received from the parking lot management device 30 to generate a video of the shielded area. The shielded area video generation unit 25 may cut the shielded area out of the images of the parking lot or may cut the shielded area out of the images of the parking lot that has been filtered and blurred.

FIG. 7 is a diagram illustrating operations of the peripheral video generation device 3 in the third embodiment. When the video data is input from four cameras 20 (S30), the peripheral video generation device 3 composites the video data from the four cameras 20 to generate a top-view video (S31). In parallel with this, the peripheral video generation device 3 uses the SfM technique on the video data to estimate the three-dimensional shape of an object seen in the video (S32).

The peripheral video generation device 3 then uses the information on the three-dimensional shape of the object to estimate an invisible shielded area in the top-view video (S33). Subsequently, the peripheral video generation device 3 acquires the images of the parking lot from the parking lot management device 30 (S34), generates a video of the shielded area using the acquired images (S35), and superimposes the generated video on the top-view video (S36).

As above, the configuration and operations of the peripheral video generation device 3 in the third embodiment have been described.

The peripheral video generation device 3 in the third embodiment can display the top-view video that appears more natural as in the above-described embodiments. In addition, in the third embodiment, using the images of the parking lot makes it easy to generate the video of the shielded area. Since the shielded area is an area of which video data cannot be acquired by the cameras 20, informing that the video data is unavailable due to the disability of acquiring the video data reduces the risk of trouble resulting from the shielded area.

In the present embodiment, as the images of the environment in which the vehicle is placed, the images of the parking lot where the vehicle actually exists are acquired as an example. Alternatively, the video of the shielded area may be generated, not using the images of the parking lot itself where the vehicle is actually placed, but using images of a kind of environment with the parking lot where the vehicle is placed.

The present disclosure is useful as a device for generating a peripheral video, and, for example, can be used to generate a peripheral video of a vehicle.

What is claimed is:

1. A peripheral video generation device comprising:
   at least one memory having a set of computer-executable instructions stored thereon;
   at least one processor communicable with the memory and a plurality of cameras; and
   the set of computer-executable instructions stored on the memory cause the processor to implement:
   inputting peripheral video data captured by the plurality of cameras;
   compositing the peripheral video data to generate a composite video as viewed from a predetermined viewpoint;
   estimating a three-dimensional shape of a peripheral object existing around the periphery of a vehicle to be parked based on the peripheral video data;
   using an estimation result of the three-dimensional shape to estimate a shielded area which is shielded by the peripheral object of the estimated three-dimensional shape and is not visible from the predetermined viewpoint in the composite video;
   inferring a video of the shielded area using deep learning, wherein:
      the video of the shielded area is inferred using a generator and a discriminator;
      the generator comprising a first neural network model configured to generate a false image intended to fool the discriminator; and
      the discriminator comprising a second neural network model configured to discriminate between the false image generated by the generator and a correct image corresponding to true data,
   wherein:
      the generator is subjected to learning with updating of parameters of the generator such that the discriminator discriminates the false image as the correct image, the video of the shielded area is inferred using the correct image; and
      the discriminator is subjected to learning with updating of parameters of the discriminator such that there is a large difference in output between when the discriminator is supplied the true data and when the discriminator is supplied the false image generated by the generator;
   generating the correct image corresponding to the true data as the generator by alternately repeating the learning of the generator and the learning of the discriminator;
   the video of the shielded area is inferred using the generator after learning, which can generate the correct image, and is generated using the correct image inferred by the generator; and
      superimposing the video of the shielded area in the composite video, wherein
      the processor transmits a control signal to the vehicle to automatically park the vehicle based on the composite video superimposed the video inferred and generated on the shielded area.

2. The peripheral video generation device according to claim 1, wherein
   the plurality of cameras is mounted in a vehicle, and
   the set of computer-executable instructions further cause the processor to implement:
      compositing a top-view video as viewed from above the vehicle.

3. The peripheral video generation device according to claim 1, wherein the set of computer-executable instructions further cause the processor to implement:
   superimposing the video inferred and generating on the shielded area in a display mode different from a display mode of the composite video.

4. A peripheral video generation method comprising:
   inputting peripheral video data captured by a plurality of cameras;
   compositing the peripheral video data to generate a composite video as viewed from a predetermined viewpoint;
   estimating a three-dimensional shape of a peripheral object existing around the periphery of a vehicle to be parked based on the peripheral video data;
   using an estimation result of the three-dimensional shape to estimate a shielded area which is shielded by the peripheral object of the estimated three-dimensional shape and is not visible from the predetermined viewpoint in the composite video;
   inferring a video of the shielded area using deep learning, wherein:
      the video of the shielded area is inferred using a generator and a discriminator;
      the generator comprising a first neural network model configured to generate a false image intended to fool the discriminator; and
      the discriminator comprising a second neural network model configured to discriminate between the false image generated by the generator and a correct image corresponding to true data,
   wherein:
      the generator is subjected to learning with updating of parameters of the generator such that the discriminator discriminates the false image as the correct image, the video of the shielded area is inferred using the correct image; and
      the discriminator is subjected to learning with updating of parameters of the discriminator such that there is a large difference in output between when the discriminator is supplied the true data and when the discriminator is supplied the false image generated by the generator;
   generating the correct image corresponding to the true data as the generator by alternately repeating the learning of the generator and the learning of the discriminator;
   the video of the shielded area is inferred using the generator after learning, which can generate the correct image, and is generated using the correct image inferred by the generator; and
   superimposing the inferred and generated video on the shielded area in the composite video, wherein
   the vehicle is controlled to automatically park based on the composite video superimposed the video inferred and generated on the shielded area.

5. A non-transitory computer-readable storage medium containing thereon a program comprising instructions configured to cause a processor to execute a peripheral video generation process, the instructions comprising:
   inputting peripheral video data captured by a plurality of cameras;

compositing the peripheral video data to generate a composite video as viewed from a predetermined viewpoint;

estimating a three-dimensional shape of a peripheral object existing around the periphery of a vehicle to be parked based on the peripheral video data;

using an estimation result of the three-dimensional shape to estimate a shielded area which is shielded by the peripheral object of the estimated three-dimensional shape and is not visible from the predetermined viewpoint in the composite video;

inferring a video of the shielded area using deep learning, wherein:

the video of the shielded area is inferred using a generator and a discriminator;

the generator comprising a first neural network model configured to generate a false image intended to fool the discriminator; and the discriminator comprising a second neural network model configured to discriminate between the false image generated by the generator and a correct image corresponding to true data, wherein:

the generator is subjected to learning with updating of parameters of the generator such that the discriminator discriminates the false image as the correct image, the video of the shielded area is inferred using the correct image; and the discriminator is subjected to learning with updating of parameters of the discriminator such that there is a large difference in output between when the discriminator is supplied the true data and when the discriminator is supplied the false image generated by the generator;

generating the correct image corresponding to the true data as the generator by alternately repeating the learning of the generator and the learning of the discriminator;

the video of the shielded area is inferred using the generator after learning, which can generate the correct image, and is generated using the correct image inferred by the generator; and superimposing the inferred and generated video on the shielded area in the composite video, wherein the vehicle is controlled to automatically park based on the composite video superimposed the video inferred and generated on the shielded area.

* * * * *